United States Patent Office 3,700,624
Patented Oct. 24, 1972

3,700,624
RESINOUS COMPOSITION
Toshio Adachi and Sayoko Funakisako, Osaka, Akio Furuya, Yokohama, and Masakatsu Uchida, Kamakura, Japan, assignors to Dai Nippon Toryo Co., Ltd., and Leben Utility Co. Ltd., both of Osaka-shi, Japan
No Drawing. Filed Apr. 28, 1971, Ser. No. 138,316
Claims priority, application Japan, Apr. 29, 1970, 45/37,073; June 16, 1970, 45/52,027; June 18, 1970, 45/53,139; July 24, 1970, 45/64,921
Int. Cl. C08f 45/36
U.S. Cl. 260—31.6
9 Claims

ABSTRACT OF THE DISCLOSURE

A resinous composition comprising a vinyl chloride resin, an unsaturated polyester resin, a polymerization initiator, a reactive plasticizer, and optionally a non-reactive plasticizer and/or a vinyl monomer, and a molded article or film prepared from said composition, which is excellent in physical and chemical properties.

BACKGROUND OF INVENTION

Field of invention

This invention relates to a resin composition comprising a vinyl chloride resin, a reactive plasticizer, an unsaturated polyester resin and a polymerization initiator, and to a molded article of film prepared from said composition.

Polyvinyl chloride plastisol comprising a reactive plasticizer selected from a lower aliphatic alcohol ester of acrylic or methacrylic acid, a vinyl chloride resin and a non-reactive plasticizer is disclosed in the specifications of U.S. Pat. No. 2,943,952, U.S. Pat. No. 3,066,110, British Pat. No. 694,444 and Japanese patent publication No. 10,732/67.

Polyvinyl chloride plastisol comprising a reactive plasticizer of a lower aliphatic alcohol ester of acrylic or methacrylic acid, a vinyl monomer and a vinyl chloride resin is disclosed in the specifications of U.S. Pat. No. 2,849,332 and U.S. Pat. No. 3,133,825.

Combinations of a vinyl chloride resin with a non-reactive plasticizer and a vinyl monomer are disclosed in the specification of U.S. Pat. No. 2,918,736.

Further molding compositions comprising a vinyl chloride resin and a reactive plasticizer such as fumaric acid ester are known from the specifications of Japanese patent publications No. 8,659/64, No. 25,795/64, No. 26,276/64, No. 1,550/66 and 10,858/68.

There have been also known molding compositions comprising an unsaturated polyester resin, a vinyl chloride resin and styrene or the like (the specifications of British Pat. No. 765,562 and French Pat. No. 1,510,442) and mixtures of an unsaturated polyester resin with a vinyl acetate resin (the specification of Japanese patent publication No. 9,269/67).

In general, unsaturated polyester resin compositions which are used for making fiber-reinforced plastics and coating compositions comprise a resin composed of an unsaturated dibasic acid, a saturated dibasic acid and a polyhydric alcohol, and a monomer such as styrene, acrylic acid ester or allyl alcohol ester.

It has been well-known in the art that these compositions are cured by incorporating therein a polymerization initiator such as organic peroxide and by heating the resulting mixture and that they are cured at room temperature when a promotor such as metal salts of naphthenic acid is used in combination.

The molded article or film obtained from such unsaturated polyester resin has the following defects:

(1) Strain occurs due to great shrinkage during curing.
(2) Hardness is considerably high, but so is brittleness.
(3) Easily combustible.
(4) Yellowing or deterioration occurs under ultraviolet rays.
(5) Poor alkali- or boiling water-resistance, since the ester linkage is readily hydrolyzed.
(6) Cracks and warps are easily formed in a thick portion of the molded article, because of exothermic reaction.
(7) Poor workability due to short pot life.

There is known the method which comprises incorporating a plasticizer in a vinyl chloride resin powder for paste so as to make a polyvinyl chloride plastisol, and further heating for preparing a molded article or film.

This method requires not less than 180° C. for preparation and the product has the following defects:

(1) Low hardness and heat distortion temperature.
(2) Poor oil resistance and solvent resistance.
(3) Poor stain resistance.
(4) Deterioration and softening of the material in contact with said molded article or film by bleeding of the plasticizer contained therein.

Further, in order to obtain the rigid molded article or film from polyvinyl chloride plastisol, there are known such methods for minimizing the amount of the plasticizer as (a) using a low viscosity plasticizer having low swelling property for the vinyl chloride resin and, (b) incorporating a suitable amount of coarse resin particles in the vinyl chloride resin for paste. However, the rigid molded article or film made by said method is defective in that since the plasticizer is used in a greater amount than in the method of preparing a rigid polyvinyl chloride resin product by calendering or extruding a vinyl chloride resin powder with a small amount of or without any plasticizer, the hardness of the rigid molded article or film is much inferior to that of the product obtained by the latter method.

Still further, there has been known a composition prepared by substituting for a part of the plasticizer a solvent having a low swelling property for the vinyl chloride resin. However, the film prepared from such composition is defective in that pin holes are frequently formed by volatilization of the solvent.

Still further, as the method of forming a molded article or film improved in hardness, softening property, solvent and stain resistance, there has been proposed a method comprising substituting a part or all of the plasticizer with a so-called reactive plasticizer having 1 to 3 double bonds in the molecule and being compatible with a vinyl chloride resin, such as an allyl alcohol ester or acrylic acid ester, adding a small amount of a radical polymerization initiator, and curing. However, the molded article or film prepared by such method is defective in that since it does not contain any unsaturated polyester resin, its hardness and softening point are lower than those of known usaturated polyester resin and conventional rigid vinyl chloride resin products. The composition including the reacting plasticizer is inferior in storage stability.

An attempt has been made to incorporate a small amount of an unsaturated polyester resin in a vinyl chloride resin, but the resulting composition is generally highly viscous. Further, since the compatibility between the unsaturated polyester resin and vinyl chloride resin is poor, when both are mixed, the viscosity is abruptly increased and gelation occurs. Still further, it is very difficult to carry out the processing or coating operation, because of the short pot life of the mixture. Moreover, the product obtained by curing such mixture is opaque and brittle, and therefore, cannot be applied practically.

For overcoming these disadvantages, there have been made proposals such as (a) a method comprising forming a low condensate polyester resin from maleic anhydride and glycol such as butane diol, and esterifying the terminal acid group with monohydric alcohol (Japanese patent publication No. 1,816/64), (b) a method using an unsaturated polyester obtained by modifying a low condensate polyester resin (prepared from maleic anhydride and glycol) with n-octanol (Japanese patent publication No. 11,142/61) and, (c) a method comprising modifying an unsaturated polyester with the vinyl chloride (Japanese patent publication No. 10,712/65). Each of these improvements gives modified polyester resins of a low condensation degree. Polyvinyl chloride plastisol incorporated with such modified polyesters may be formed into molded articles or films having a high hardness. However, the composition obtained from such polyvinyl chloride plastisol is defective in that, when they are exposed to the air, the curing in the surface portion is slower than the curing in the interior portion and that molded articles of films prepared therefrom are brittle.

Recently, the techniques concerning unsaturated polyester resins and polyvinyl chloride plastisol have rapidly improved, but because of the above-mentioned defects and disadvantages, their application is very restricted.

This invention relates to a novel resinous composition overcoming the above-mentioned defects and disadvantages of the conventional techniques.

The primary object of this invention is to provide a resinous composition comprising a vinyl chloride resin, a reactive plasticizer, an unsaturated polyester resin, and a polymerization initiator, from which there can be formed a molded article or film which is excellent in hardness, flexibility, and impact, abrasion, chemical, heat and flame resistance.

Other objects of the invention will be obvious from the contents of the specification hereinafter disclosed.

In accordance with this invention, there is provided a thermosetting resinous composition comprising 5.0–94.8% by weight of the vinyl chloride resin and the plasticizer which includes at least one reactive plasticizer, 94.8–5% by weight of the unsaturated polyester resin, and 0.2–3.0% by weight of the polymerization initiator.

In accordance with this invention, there is also provided a process for preparing the molded articles or film by curing said composition at a temperature of 100–140° C. before changing of the sol state.

When the sol state is changed, vinyl chloride resin particles are swelled with the plasticizer or the like and dissolved therein, and thus the fluidity of the composition is lost and the molding cannot be accomplished conveniently.

The main components of the composition of this invention are blended, for instance, by the following methods:

(1) the method comprising dispersing vinyl chloride resin particles into the reactive plasticizer or a mixture of the reactive plasticizer with a non-reactive plasticizer according to the known technique to form the polyvinyl chloride plastisol, and mixing said plastisol with (a) a solution of the unsaturated polyester resin in a reactive plasticizer, (b) a solution of the unsaturated polyester resin in vinyl monomer, or (c) a mixed solution of the unsaturated polyester resin, the reactive plasticizer and vinyl monomer.

(2) the method comprising dispersing a vinyl chloride resin powder directly in (a) a solution of the unsaturated polyester resin in the reactive plasticizer, (b) a solution of the unsaturated polyester resin in vinyl monomer, or (c) a mixed solution of the unsaturated polyester resin, the reactive plasticizer and vinyl monomer.

The said composition is cured at 100–140° C. in the presence of the polymerization initiator, whereby the reactive plasticizer and the unsaturated polyester resin form, individually or in combination, a cross-linked three dimensional structure, and the gel of the vinyl chloride resin and the non-reactive plasticizer are confined by the said cross-linked three dimensional structure. Therefore, there is obtained a product of increased hardness and strength.

The vinyl chloride resin to be used in the composition of this invention includes a homopolymer of vinyl chloride and a copolymer of vinyl chloride with other monomer copolymerizable therewith. Namely, it includes copolymers of vinyl chloride with vinyl acetate, vinyl propionate, methyl methacrylate, butyl acrylate, vinylidene chloride, acrylonitrile, vinyl ether, diethyl maleate, acrylic acid, methacrylic acid, maleic anhydride and the like. It further includes a saponified product of a copolymer of vinyl chloride with vinyl acetate.

For obtaining a molded article or film having excellent physical properties, it is important that such homopolymer or copolymer of vinyl chloride should be highly polymerized, and it is generally preferable to use a homopolymer or copolymer of vinyl chloride having a degree of polymerization ranging from 500 to 2500. Preferable average particle sizes of such vinyl chloride resin are from 0.05 to 50 microns, especially from 0.2 to 2 microns. It is best to use a homopolymer of vinyl chloride or a copolymer of vinyl chloride with vinyl acetate containing 95–99% by weight of vinyl chloride which has been prepared for plastisol. In order to obtain a plastisol of low viscosity, it is possible to use a coarse vinyl chloride resin as an extender having a particle size of 5–100 microns in combination with such homopolymer or copolymer.

The reactive plasticizer to be used in the composition of this invention is an acrylic acid ester plasticizer expressed by the general formula

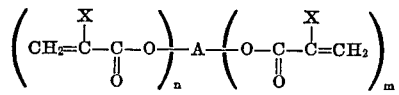

wherein A is a residue of a compound having at least two hydroxyl groups at the molecule ends or a compound having at least one ester or ether linkage in the molecule and at least two terminal hydroxyl groups; X stands for hydrogen, halogen or an alkyl group such as methyl and ethyl; and $n$ and $m$ are integers of 1 to 3.

There may be exemplified ethyleneglycol dimethacrylate, propyleneglycol dimethacrylate, 1,3-butanediol dimethacrylate, 1,4-butanediol dimethacrylate, 2,3-butanediol dimethacrylate, 2-ethyl-1,3-hexanediol dimethacrylate, 1,5-pentanediol dimethacrylate, 1,6-hexanediol dimethacrylate, neopentylglycol dimethacrylate, glycerin trimethacrylate, dimethacryl (bis-diethyleneglycol) phthalate, dimethacryl (bis-diethyleneglycol) phthalate, dimethacryl (bis-diethyleneglycol) maleate, tetramethacryl (bis-glycerin) phthalate, triethyleneglycol dimethacrylate, tetramethyleneglycol dimethacrylate, polyethyleneglycol dimethacrylate, and trimethylolpropane trimethacrylate. In addition, there may be used allyl-type reactive plasticizers such as triallyl acrylate, allyl cyanurate, diallyl maleate, diallyl itaconate, diallyl sebacate, diallyl adipate, diallyl glycolate, triallyl aconitate, diallyl monooctyl phosphate, triallyl phosphate, diallyl isophthalate and diallylbenzene phosphate.

These reactive plasticizers may be used in combination.

These reactive plasticizers are found to exhibit an effect of increasing the compatibility between the vinyl chloride resin and the unsaturated polyester resin, and other effects of improving mechanical properties, the heat distortion temperature and the transparency of the molded article or film. However, in view of the curing rate, reactive plasticizers of an acrylic acid ester are most preferred, because they exhibit the highest curing rate among the above-mentioned reactive plasticizers.

It is also possible to substitute a part of the reactive plasticizer by a non-reactive plasticizer. By such substitution, there are brought about various advantages. For instance, the curing rate can be adjusted and the exothermic reaction temperature can be controlled, whereby occurrence of cracks can be prevented in preparing molded articles of a complicated configuration. Further, the impact resistance of the cured product can be improved.

As the unsaturated polyester resin to be used in the composition of this invention, there may be used commercially available ones for preparing molded articles, decorative plates, laminated plates, coatings and the like.

More specifically, there may be used unsaturated polyester resins formed by condensation of a mixture of unsaturated dibasic acids and aromatic dicarboxylic acids with polyhydric alcohols. As the unsaturated dibasic acid there may be exemplified maleic acid and anhydride, and fumaric acid. Itaconic acid is also usable in some cases. As the aromatic dibasic acid there may be exemplified phthalic anhydride, isophthalic acid, terephthalic acid and chlorinated phthalic acid. As the polyhydric alcohol there may be used, for instance, ethylene glycol, diethylene glycol, propylene glycol, dipropylene glycol, 1,3-butanediol, 2,3-butanediol, neopentyl glycol, hydrogenated bisphenol A, 2,2'-bis(4'-hydroxyphenyl)-propane, and 2,2-di-(4-hydroxypropoxyphenyl) propane.

It is desired that the unsaturated polyester resin have an average condensation degree of at least 4 and a molecular weight of 1000 or more. In the case of an unsaturated polyester resin having a molecular weight of less than 1000, the mechanical properties of the final cured product are poor. Accordingly, the use of such unsaturated polyester resin is not preferred.

The vinyl monomer referred to in this invention includes monomers having a double bond in the molecule. As such monomer, there may be exemplified styrene, vinyl acetate, methyl methacrylate, butyl acrylate, chlorostyrene, divinyl benzene. The vinyl monomer is incorporated in the composition for the purposes of adjusting the viscosity of the composition, and improving hardness, chemical resistance and mechanical properties of the resulting molded article and film.

As the non-reactive plasticizer there may be used any of conventional non-reactive plasticizers for polyvinyl chloride, such as phthalic acid esters, e.g., dibutyl phthalate, diamyl phthalate, dimethoxyethyl phthalate, dibutoxyethyl phthalate, dicyclohexyl phthalate, dihexyl phthalate, diheptyl phthalate, butyloctyl phthalate, di-(n-octyl)phthalate, di-(2-ethylhexyl) phthalate, diisooctyl phthalate, didecyl phthalate, didodecyl phthalate and butylbenzyl phthalate; phosphates, e.g., alkyl diphenyl phosphate and tricresyl phosphate; and others e.g., dicapryl, didecyl and di-2-ethylhexyl esters of adipic acid, succinic acid, azelaic acid, and sebacic acid. In addition, customary saturated polyester and epoxy-type plasticizers for ordinary vinyl chloride resins, and chlorinated paraffins may be used in combination with the above-exemplified non-reactive plasticizers. It is preferable to use a plasticizer which does not affect the fluidity or storage stability of the polyvinyl chloride plastisol. These are used in admixtures of two or more plasticizers.

The non-reactive plasticizer is incorporated in the composition of this invention for adjusting the viscosity of the composition, controlling the exothermic reaction temperature at the time of curing and improving the flexibility of the resulting molded article and film.

As the polymerization initiator to be used in this invention there may be exemplified organic peroxides such as acetyl peroxide, methylethylketone peroxide, lauryl peroxide, benzoyl peroxide, tertiary-butyl perbenzoate, di-tertiary-butyl peroxide, hydroxycyclohexyl hydroperoxide and cumene hydroperoxide; and azo-type catalysts such as α,α'-azobisisobutyronitrile. These polymerization initiators may be used in combination.

In the composition of this invention, preferable proportions of the vinyl chloride resin, the unsaturated polyester resin, the reactive plasticizer, the non-reactive plasticizer, the vinyl-type monomer and the polymerization initiator are as follows:

(i) In case the non-reactive plasticizer is not used:

(a) In the absence of the vinyl monomer—

|  | Percent by weight |
|---|---|
| Vinyl chloride resin | 5–50 |
| Unsaturated polyester resin | 10–60 |
| Reactive plasticizer | 25–50 |
| Polymerization initiator | 0.2–3 |

(b) In the presence of the vinyl-type monomer—

|  | Percent by weight |
|---|---|
| Vinyl chloride resin | 5–50 |
| Unsaturated polyester resin | 10–60 |
| Reactive plasticizer | 5–40 |
| Vinyl monomer | Less than 40 |
| Polymerization initiator | 0.2–3 |

In the above composition, when the vinyl-type monomer content exceeds 40% by weight, the exothermic reaction at the time of curing is vigorous and the volume shrinkage is great, and as a result stress is readily brought about. Further, the mechanical strength and chemical resistance of the molded article and film are decreased.

(ii) In case the non-reactive plasticizer is used:

(a) Thermosetting resinous composition for molding—

|  | Percent by weight |
|---|---|
| Polyvinyl chloride plastisol | 10–90 |
| Unsaturated polyester resin | 10–60 |
| Reactive plasticizer | 2–50 |
| Polymerization initiator | 0.2–3 |

In the above composition, the polyvinyl chloride plastisol comprises 15–60% by weight of the non-reactive plasticizer, and the unsaturated polyester resin solution comprises less than 60% by weight of the vinyl monomer.

(b) Thermosetting coating composition—

|  | Percent by weight |
|---|---|
| Polyvinyl chloride plastisol | 15–90 |
| Unsaturated polyester resin solution | 5–75 |
| Reactive plasticizer | 2–40 |
| Polymerization initiator | 0.2–3 |

In the above composition, the polyvinyl chloride plastisol comprises 15–60% by weight of the non-reactive plasticizer, and the unsaturated polyester resin solution comprises less than 60% by weight of the vinyl monomer.

A preferable ratio of non-reactive plasticizer to reactive plasticizer is from 0.1 to 10 in the above (a) and (b).

In the case of conventional polyvinyl chloride plastisol, it is necessary to carry out the curing at temperatures exceeding 180° C. When a molded article of a great thickness is prepared, the curing must continue for a long time to melt the article sufficiently up to the inner part.

In the composition of this invention, the reactive and non-reactive plasticizer and/or the vinyl monomer assist the fusion of the vinyl chloride resin and, therefore, the hardening reaction can be accomplished at a relatively low temperature in a short time, even though a molded article of great thickness is desired. Further, the vigorous exothermic reaction observed in the molding of conventional unsaturated polyester resins is not seen in the molding of the composition of this invention. Accordingly, extreme shrinkage, stress and crack can be prevented.

Advantages of the resinous composition of this invention and molded articles and film formed therefrom in comparison with the conventional unsaturated polyester resin and vinyl chloride resin and molded articles and film prepared therefrom are summarized below.

(1) The composition of this invention takes the form of a liquid of good fluidity and therefore, its workability in molding and coating is excellent.

(2) The volume shrinkage at the time of curing is smaller than that of an unsaturated polyester resin.

(3) The vigorous exothermic reaction at the time of curing can be readily controlled as compared with that of an unsaturated polyester resin. Further, the hardness, elasticity and other mechanical properties of the resulting product are superior to those of products produced from an unsaturated polyester resin.

(4) The fusion of the vinyl chloride resin is accomplished by utilizing the heat of polymerization, and the product can be obtained at a relatively low curing temperature such as 100–140° C.

(5) The composition of this invention provides a molded article and film which are excellent in heat, water, weathering and chemical resistance, and transparency.

(6) The product prepared from the composition of this invention is flame resistant.

(7) Proportions of the components can be easily changed, making it possible to obtain the products of desired properties.

(8) The products prepared from the composition of this invention exhibit good stain resistance.

(9) A material in contact with the product produced from the composition of this invention, does not experience any deterioration, contamination or softening due to bleeding of the plasticizer.

The improvements of physical and chemical properties are attained by the fact that the compatibility between the vinyl chloride resin and unsaturated polyester resin is highly increased by the use of the reactive plasticizer.

It is possible to add to the composition of this invention reinforcing material, fillers, stabilizers, pigments, dyestuffs, lubricants, mold releasing agents and other additives, if desired.

Film, cast articles, laminated plates, plastic molded articles reinforced with glass fibers and other molded articles, which are excellent especially in hardness and exhibit good heat distortion and also have good mechanical properties, are obtained from the composition of this invention by customary techniques such as casting, centrifugal molding, dipping, spray-up, filament winding and spread coating. Further, when the composition of this invention is used, a molded article having a smooth surface can be obtained by a casting method or a method using a hot press or a transfer molder since the viscosity of the compound can be easily adjusted.

Since the molded article of the composition of this invention is characterized by small volume shrinkage, it is suitable especially for press molding. It is possible to incorporate therein reinforcing material such as glass fiber, asbestos, carbon fiber, synthetic fiber and natural fiber. Even though such reinforcing materials are incorporated, they will not appear in a fiber pattern on the surface of the molded product.

Further the molded article and film have an excellent dimension stability with less cracks.

The composition of this invention can be conveniently applied in the decoration and rust-prevention of steel structures, the pre-coating of metal plates, the formation of decorative coatings on slate or wooden articles, and the formation of anti-corrosive coatings of steel pipes. The baking must be carried out at temperatures exceeding 180° C. in case of the conventional polyvinyl chloride plastisols. On the contrary, the baking is sufficiently accomplished at temperatures about 120° C. in the composition of this invention.

The composition of this invention can be applied by any of customary coating technique such as roller, knife, spray, dipping and brush coating.

This invention will now be detailed by referring to examples, in which all "parts" and "percentages" are on the weight basis.

EXAMPLE 1

One hundred parts of the vinyl chloride resin for plastisol having an average degree of polymerization of 1700 was dispersed with 60 parts of trimethylolpropane trimethacrylate, 3 parts of the stabilizer for vinyl chloride resin and 1 part of the polymerization initiator, and the resulting blend was subjected to defoaming treatment under reduced pressure. Thus there was produced a polyvinyl chloride plastisol. Separately, a 2-liter capacity four-neck flask equipped with a stirrer, a thermometer, a steam and water-jacketed partial condenser, and a nitrogen gas-introducing tube was charged with 1 mole of neopentyl glycol, 0.5 mole of dimethyl terephthalate, 0.5 mole of maleic anhydride, 0.15% of sodium formate based on the above three compounds and 6% of xylene based on the above three compounds. The temperature of the mixture was raised from 160 to 195° C. under a nitrogen gas atmosphere for 4 hours, while recovering methanol formed by the reaction, and the reaction was further continued at 190° C. for 5 hours. Xylene was removed under reduced pressure. Thus, there was obtained an unsaturated polyester resin A having an acid value of 18.

Thirty parts of the unsaturated polyester resin A was dissolved in 20 parts of trimethylolpropane trimethacrylate, and 0.05% of hydroquinone was added to the solution to prepare an unsaturated polyester resin solution A–1. The above polyvinyl chloride plastisol was added to the unsaturated polyester solution A–1 to produce the resinous composition (Sample No. 1).

Separately, 30 parts of the unsaturated polyester resin A were dissolved in 20 parts of styrene, and 0.01% of hydroquinone was added thereto to produce an unsaturated polyester resin solution A–2. Four hundred and eighty parts of the unsaturated polyester resin A were dissolved in 320 parts of styrene, and 0.15% of hydroquinone was added thereto to prepare an unsaturated polyester resin solution A–3. The above polyvinyl chloride plastisol was blended in the unsaturated polyester resin solution A–2 and A–3 to prepare resinous compositions (Sample Nos. 2 and 3).

Each of these samples was cured for 20 minutes at 120° C., and a test piece (10 x 4 x 100 mm.) was prepared by casting. The test piece was immersed in a 10% aqueous solution of caustic soda maintained at 50° C. for 30 days, and then was subjected to the bending test. The strength retention rate based on the initial flexural strength before immersion was calculated.

For comparison, the cast product obtained by curing at 60° C. for 2 hours a composition (Sample 4) formed by adding the polymerization initiator and the polymerization promotor to an unsaturated polyester resin solution (60% of unsaturated polyester resin A and 40% of sytrene) was subjected to the same bending test.

The results are shown in Table 1.

From the results of Table 1, it is readily understood that the composition of this invention exhibits an excellent alkali-resistance, and the strength retention is higher than that of the comparative composition.

TABLE 1

| Formulation (parts) | Sample number | | | |
| --- | --- | --- | --- | --- |
|  | ¹1 | ¹2 | ¹3 | ²4 |
| Vinyl chloride resin for paste | 100 | 100 | 100 | |
| Trimethylolpropane trimethacrylate | 60 | 60 | 60 | |
| Stabilizer (Zn/Cd/Ba liquid organic complex) | 3 | 3 | 3 | |
| Tertiary-butyl perbenzoate | 1 | 1 | 6 | |
| Methylethylketone peroxide | | | | 1 |
| Unsaturated polyester resin A | 30 | 30 | 480 | 60 |
| Styrene | | 20 | 320 | 40 |
| Trimethylolpropane trimethacrylate | 20 | | | |
| Cobalt naphthenate | | | | 0.2 |
| Strength retention (percent) after immersion in alkali | 95 | 93 | 86 | 54 |

¹ This invention. ² Comparison.

EXAMPLE 2

One hundred parts of the vinyl chloride resin for plastisol having an average degree of polymerization of 1700 was blended with 80 parts of ethyleneglycol dimethacrylate, 3 parts of the stabilizer for vinyl chloride resin, and 2 parts of the polymerization initiator, and the defoaming treatment was conducted under reduced pressure. Thus there was obtained a polyvinyl chloride plastisol.

Separately, a 2-liter capacity four-neck flask equipped with a stirrer, a thermometer, a partial condenser, and a nitrogen gas-introducing tube was charged with 0.5 mole of neopentyl glycol, 0.5 mole of propylene glycol, 0.4 mole of phthalic anhydride, 0.6 mole of maleic anhydride, and 5% of xylene based on the foregoing charge, and they were reacted under a nitrogen gas atmosphere for 4 hours at 150–180° C. and for an additional 4 hours at 200–220° C. while removing water produced by the reaction. Then, xylene was distilled off under reduced pressure. Thus there was obtained an unsaturated polyester resin B having an acid value of 28. 70 parts of the unsaturated polyester resin B was dissolved in 30 parts of styrene, and 0.01% of hydroquinone was added thereto to produce an unsaturated polyester resin solution B–1. The polyvinyl chloride plastisol was mixed in the unsaturated polyester resin solution B–1 to produce a resinous composition (Sample No. 5). The viscosity of this composition, and the appearance, mechanical properties and chemical properties of a cast product obtained by curing said composition at 135° C. for 20 minutes were excellent, as shown in Table 2.

For comparison, properties and test results of a cast product (Sample No. 6) obtained by curing a mixture of the vinyl chloride resin and the unsaturated polyester resin solution B–1 at 135° C. for 20 minutes, a cast product (Sample No. 7) obtained by curing a mixture of the polyvinyl chloride plastisol prepared in the same manner as above by using di-(2-ethylhexyl) phthalate instead of ethyleneglycol dimethacrylate, with the unsaturated polyester resin solution B–1 at 150° C. for 20 minutes, and a cast product (Sample No. 8) obtained by curing the unsaturated polyester resin solution at 60° C. for 2 hours, are also shown in Table 2.

From the results shown in Table 2, it is seen that the composition of this invention exhibits an excellent viscosity stability of the solution, and that the cast product from the composition of this invention is excellent in transparency, mechanical properties and chemical resistance.

EXAMPLE 3

The unsaturated polyester resin B was dissolved in diallyl phthalate warmed to 40° C., and a resin composition (Sample No. 9) was prepared based on the formulation shown in Table 3 in the same manner as in Example 2. The composition was cured at 135° C. for 1 hour. The resulting article was as excellent in low volume shrinkage, mechanical and chemical properties as the article prepared from the composition of Sample No. 5 in Example 2.

TABLE 3

Sample No. 9 (this invention)

Formulation (parts):
- Vinyl chloride resin _____ 100
- Diallyl phthalate _____ 60
- Stabilizer (Zn/Cd/Ba liquid organic complex) _____ 3
- Tertiary-butyl perbenzoate _____ 2
- Unsaturated polyester resin B _____ 30
- Diallyl phthalate _____ 50

EXAMPLE 4

One hundred parts of the vinyl chloride resin for plastisol having an average degree of polymerization of 1700 was dispersed in 100 parts of tetraethyleneglycol dimethacrylate to produce a polyvinyl chloride plastisol. Then, a 30% solution of styrene in the unsaturated polyester resin B was mixed with said polyvinyl chloride plastisol to produce a resinous composition (Sample No. 10). The composition was molded into a cast article in the shape of a disc (50 mm. diameter and 5 mm. thickness) and a film (thickness of about 1 mm.). The disc and film were cured at 130° C. for 20 minutes. The hardness of the cast article was measured. The solvent resistance of the film was determined by measuring the weight loss based on the initial weight after immersion in xylene at room temperature for 7 days. Further, the stain resistance of the film was examined by applying rouge, black and red ink to the film and allowing it to stand at room temperature for 24 hours. Similar tests were carried out for a comparison film prepared from a plastisol (Sample No. 11) of 100 parts of vinyl chloride resin for plastisol, 30 parts of tetraethyleneglycol dimethacrylate, and 70 parts of di-2-(ethylhexyl)phthalate. It was seen that the molded article from the resinous composition comprising the vinyl chloride resin, the unsaturated polyester resin, the reactive plasticizer and the vinyl monomer was superior in hardness,

TABLE 2

| Formulation (parts) | [1] 5 | [2] 6 | [2] 7 | [2] 8 |
|---|---|---|---|---|
| Vinyl chloride resin | 100 | 100 | 100 | |
| Stabilizer (Zn/Cd/Ba liquid organic complex) | 3 | 3 | 3 | |
| Ethyleneglycol dimethacrylate | 80 | | | |
| Di-(2-ethylhexyl)phthalate | | | 80 | |
| Tertiary-butyl perbenzoate | 2 | 2 | 2 | |
| Methylethylketone peroxide | | | | 2. |
| Unsaturated polyester resin B | 70 | 70 | 70 | 140. |
| Styrene | 30 | 30 | 30 | 60. |
| Cobalt naphthenate | | | | 0.8. |
| Comparative test: | | | | |
| Solution condition (viscosity stability) | Good | Great increase of viscosity. | Great increase of viscosity. | Pot life less than 1 hour. |
| Appearance of cast product | Transparent | Opaque with cracks. | Opaque | Transparent. |
| Volume shrinkage (percent) | 1.1 | | | 8.8. |
| Rockwell hardness (R) | 121 | Measurement impossible. | Measurement impossible. | 125. |
| Shore hardness (D) | 89 | 28 | 35 | 90. |
| Tensile strength (kg./mm.²) | 6.4 | | | 5.6. |
| Flexural strength (kg./mm.²) | 10.1 | | | 9.5. |
| Modulus of elasticity (kg./mm.²) | 335 | | | 290. |
| Compressive strength (kg./mm.²) | 12.0 | | | 12.3. |
| Impact strength (charpy, kg. cm./cm.²) | 4.0 | | | 3.5. |
| Heat distortion temperature (° C.) | 118 | | | 95. |
| Alkali resistance (20% NaOH, 24 hours) | −0.5 | | | −3.0. |
| Water absorption (25° C., one week) | 0.18 | | | 0.29. |
| Flame resistance | Self-extinguishing | | | Easily combustible. |

[1] This invention;  [2] Comparison.

solvent and stain resistance to the molded article prepared from the plastisol composition.

TABLE 4

| Formulation (parts) | Sample number | |
|---|---|---|
| | 10[1] | 11[2] |
| Vinyl chloride resin | 100 | 100 |
| Tetraethyleneglycol dimethacrylate | 100 | 30 |
| Di-(2-ethylhexyl)phthalate | --- | 70 |
| Stabilizer (Zn/Cd/Ba liquid organic complex) | 3 | 3 |
| Tertiary-butyl perbenzoate | 5 | 1 |
| Unsaturated polyester resin B | 280 | --- |
| Styrene | 120 | --- |
| Test results: | | |
| Rockwell hardness (R) | 122 | (3) |
| Shore Hardness (A) | 95 | 66 |
| Solvent resistance (percent weight loss) | 1.1 | 15.1 |
| Stain resistance | (4) | Stain |

[1] This invention.
[2] Comparison.
[3] Measurement impossible.
[4] No stain.

EXAMPLE 5

Complying with the same method as adopted in Example 1 for preparing the unsaturated polyester resin A, there was prepared an unsaturated polyester resin C having an acid value of 22 from 1 mole of neopentyl glycol, 0.5 mole of dimethyl terephthalate and 0.5 mole of itaconic acid. Then, an unsaturated resin solution C-1 containing 30% of styrene and 0.01% of hydroquinone was prepared. In a similar manner, an unsaturated polyester resin D having an acid value of 11 was prepared from 1 mole of neopentyl glycol, 0.5 mole of dimethyl terephthalate, 0.4 mole of maleic anhydride and 0.1 mole of adipic acid. Then, an unsaturated resin solution D-1, containing 30% of styrene and 0.01% of hydroquinone was prepared.

Separately, an unsaturated polyester resin solution B-2 containing 30% of styrene and 0.01% of hydroquinone was prepared.

In accordance with the same method as adopted for preparing the unsaturated polyester resin B, there was prepared an unsaturated polyester resin E of an acid value of 18 by reacting 1 mole of neopentyl glycol, 0.4 mole of phthalic anhydride and 0.6 mole of maleic anhydride. Then, an unsaturated polyester resin solution E-1 containing 30% of styrene and 0.01% of hydroquinone was prepared.

Separately, 60 parts of di-(2-ethylhexyl)phthalate was blended in 100 parts of a vinyl chloride resin for plastisol having an average degree of polymerization of 1650, and the polymerization initiator and the stabilizer. Then, the blend was subjected to defoaming treatment to produce a polyvinyl chloride plastisol.

The plastisol was mixed with 40 parts of ethyleneglycol dimethacrylate. Each of the above-mentioned unsaturated polyester resin solutions was separately mixed into the plastisol to produce resinous compositions (Sample Nos. 13, 15, 17 and 19). For comparison, resinous compositions free from the reactive plasticizer (Sample Nos. 12, 14, 16 and 18) were prepared in the same manner. With respect to each composition, the viscosity of the composition was examined, and a molded article (disc of 50 mm. diameter and 5 mm. thickness) prepared by casting the composition under an atmospheric pressure at 135° C. for 15 minutes was subjected to tests to determine the physical properties and the appearance.

In compositions free from the reactive plasticizer, the viscosity was abruptly increased just after mixing of the polyvinyl chloride plastisol and unsaturated polyester resin solution. It was confirmed that the physical properties of molded articles obtained by curing compositions free from the reactive plasticizer were poor.

TABLE 5

| Formulation (parts) | Sample number | | | | | | | |
|---|---|---|---|---|---|---|---|---|
| | 12[1] | 13[2] | 14[1] | 15[2] | 16[1] | 17[2] | 18[1] | 19[2] |
| Vinyl chloride resin for paste | 100 | 100 | 100 | 100 | 100 | 100 | 100 | 100 |
| Di-(2-ethylhexyl) phthalate | 60 | 60 | 60 | 60 | 60 | 60 | 60 | 60 |
| Stabilizer (organic compound) | 2 | 2 | 2 | 2 | 2 | 2 | 2 | 2 |
| Benzoyl peroxide (50% DOP paste) | 3.2 | 3.2 | 3.2 | 3.2 | 3.2 | 3.2 | 3.2 | 3.2 |
| Ethyleneglycol dimethacrylate | --- | 40 | --- | 40 | --- | 40 | --- | 40 |
| Unsaturated polyester resin solution (notation) | 160(B-2) | 120(B-2) | 160(C-1) | 120(C-1) | 160(D-1) | 120(D-1) | 160(E-1) | 120(E-1) |
| Results of comparative tests: | | | | | | | | |
| Viscosity change | Abruptly increased at 25° C. | Stable after 3 months | Abruptly increased at 25° C. | Stable after 3 months | Abruptly increased at 25° C. | Stable after 3 months | Abruptly increased at 25° C. | Stable after 3 months |
| Appearance | Turbid | Semitransparent | Turbid | Semitransparent | Turbid | Semitransparent | Turbid | Semitransparent |
| Hardness (Rockwell M) | <30 | 57 | <30 | 55 | <30 | 42 | <30 | 51 |
| Impact resistance (falling ball test)[3] | Crushed | Not changed | Crushed | Not changed | Crushed | Not changed | Crushed | Not changed |

[1] Comparison. [2] This invention [3] A steel ball of 500 g. was dropped on the molded article from the height of 50 cm.

EXAMPLE 6

Unsaturated polyester resin solutions B-3 and B-4 were prepared by respectively adding 30 parts of methyl methacrylate and butyl acrylate in 70 parts of the unsaturated polyester resin B. Similarly, there were prepared unsaturated polyester resin solutions C-2 and C-3 by respectively adding 30 parts of methyl methacrylate and butyl acrylate to 70 parts of the unsaturated polyester resin C.

Separately, 50 parts of tricresylphosphate was mixed into 100 parts of a vinyl chloride resin for plastisol having an average degree of polymerization of 1,300, and a deforming treatment was carried out under reduced pressure. The mixture was incorporated with 50 parts of polyethyleneglycol dimethacrylate, the stabilizer and the polymerization initiator to produce a polyvinyl chloride plastisol.

Resinous compositions (Sample Nos. 20-23) were prepared from the polyvinyl chloride plastisol and the unsaturated polyester resin solutions B-3, B-4, C-2 and C-3, respectively. Similar tests were done according to Example 5, and molded articles were subjected to flame resistance test. Results are shown in Table 6.

TABLE 6

| Formulation (parts) | Sample number | | | |
|---|---|---|---|---|
| | [1] 20 | [1] 21 | [1] 22 | [1] 23 |
| Vinyl chloride resin | 100 | 100 | 100 | 100. |
| Tricresyl phosphate | 50 | 50 | 50 | 50. |
| Stabilizer (organotin compound) | 2 | 2 | 2 | 2. |
| Benzoyl peroxide (50% DOP paste) | 3 | 3 | 3 | 3. |
| Polyethyleneglycol dimethacrylate | 50 | 50 | 50 | 50. |
| Unsaturated polyester resin solution (notation) | 100(B-3) | 100(B-4) | 100(C-2) | 100(C-3). |
| Comparative tests: | | | | |
| Change of viscosity | Not changed | Not changed | Not changed | Not changed. |
| Appearance | Semitransparent | Semitransparent | Semitransparent | Semitransparent. |
| Hardness (Rockwell M) | 49 | 38 | 48 | 36. |
| Impact resistance (falling ball test) | Not changed | Not changed | Not changed | Not changed. |
| Flame resistance | Self-extinguishing | Self-extinguishing | Self-extinguishing | Self-extinguishing. |

[1] This invention.

EXAMPLE 7

Trimethylolpropane trimethacrylate was added to the unsaturated polyester resin C in an equivalent amount, and the mixture was warmed to 40° C. to dissolve the resin C in the trimethylolpropane trimethacrylate.

were then mixed with the unsaturated polyester resin solution E-1. to produce resinous compositions (Sample Nos. 31-35). Comparative tests were carried out in the same manner as described in previous examples. Results are shown in Table 8.

TABLE 8

| Formulation (parts) | Sample Number | | | | |
|---|---|---|---|---|---|
| | [1] 31 | [1] 32 | [1] 33 | [1] 34 | [1] 35 |
| Vinyl chloride resin | 100 | 100 | 100 | 100 | 100. |
| Di-(2-ethylhexyl)phthalate | 60 | 60 | 60 | 60 | 60. |
| Stabilizer(organotin compound) | 2 | 2 | 2 | 2 | 2. |
| Benzoyl peroxide (50% DOP paste) | 3.2 | 3.2 | 3.2 | 3.2 | 3.2. |
| Diethyleneglycol dimethacrylate | 40 | | | | |
| Tetraethyleneglycol dimethacrylate | | 40 | | | |
| Polyethyleneglycol dimethacrylate | | | 40 | | |
| Trimethylolpropane trimethacrylate | | | | 40 | |
| Diallyl phthalate | | | | | 40. |
| Unsaturated polyester resin Solution E-1 | 120 | 120 | 120 | 120 | 120. |
| Comparative tests: | | | | | |
| Viscosity change (25° C., 3 months) | Not changed | Not changed | Not changed | Not changed | Not changed. |
| Appearance | Semi-transparent | Semi-transparent | Semi-transparent | Transparent | Semi-transparent. |
| Hardness (Rockwell M) | 55 | 54 | 52 | 50 | 45. |
| Impact resistance (falling ball test) | Not changed | Not changed | Not changed | Not changed | Not changed. |
| Flame resistance | Self-extinguishing | Self-extinguishing | Self-extinguishing | Self-extinguishing | Self-extinguishing. |

[1] This invention.

Separately, 100 parts of a vinyl chloride resin for plastisol having an average degree of polymerization of 1,700 was mixed with 100 parts of di-(2-ethylhexyl)phthalate, the stabilizer and the polymerization initiator, and foams were removed from the mixture by reducing the pressure. The polyvinyl chloride plastisol was mixed with the above unsaturated polyester resin solution at varying mixing ratios indicated in Table 7 to produce resinous compositions (Sample Nos. 24-29).

With respect to each sample, the comparative tests were conducted in the same manner as described in preceding examples. Results are shown in Table 7. For comparison, the test results of a composition comprising of 800 parts of the unsaturated polyester resin C and 800 parts of trimethylolpropane trimethacrylate (Sample No. 30) are also shown in Table 7.

EXAMPLE 9

One hundred parts of the vinyl chloride resin for plastisol having an average degree of polymerization of 1700 was mixed with 30 parts of di-(2-ethylhexyl)phthalate and 30 parts of trimethylolpropane trimethacrylate, and mixture was subjected to the defoaming treatment under reduced pressure to produce a polyvinyl chloride plastisol. Then, the plastisol was mixed with the stabilizer and the polymerization initiator, and the unsaturated polyester resin solution D-1 was further added thereto to produce a resinous composition (Sample No. 37). A molded article cured at 130° C. for 15 minutes was subjected to tests to determine the physical properties thereof. Results are shown in Table 9.

For comparison, physical properties of a molded article

TABLE 7

| Formulation (parts) | Sample Number | | | | | | |
|---|---|---|---|---|---|---|---|
| | [1] 24 | [1] 25 | [1] 26 | [1] 27 | [1] 28 | [1] 29 | [2] 30 |
| Vinyl chloride resin | 100 | 100 | 100 | 100 | 100 | 100 | |
| Di-(2-ethylhexyl)phthalate | 100 | 100 | 100 | 100 | 100 | 100 | |
| Stabilizer (Zn/Cd/Ba liquid organic complex) | 3 | 3 | 3 | 3 | 3 | 3 | |
| Tertiary-butyl perbenzoate | 1 | 1 | 2 | 4 | 8 | 16 | 16. |
| Unsaturated polyester resin C | 25 | 50 | 100 | 200 | 400 | 800 | 800. |
| Trimethylolpropane trimethacrylate | 25 | 50 | 100 | 200 | 400 | 800 | 800. |
| Comparative tests: | | | | | | | |
| Viscosity change (25° C., 3 months) | Not changed | Not changed | Not changed | Not changed | Not changed | Not changed | Not changed. |
| Appearance | Transparent | Transparent | Transparent | Transparent | Transparent | Transparent | Transparent. |
| Hardness (Rockwell M) | 32 | 44 | 55 | 79 | 89 | 101 | 107. |
| Impact resistance (falling ball test) | Not changed | Not changed | Not changed | Not changed | Not changed | Not changed | Crushed. |
| Flame resistance | Self-extinguishing | Self-extinguishing | Self-extinguishing | Self-extinguishing | Self-extinguishing | Self-extinguishing | Easily combustible. |

[1] This invention. [2] Comparison.

EXAMPLE 8

A polyvinyl chloride plastisol was prepared based on the formulation described in Example 5. Various reactive plasticizers indicated in Table 8 were individually added to the plastisol to produce plastisol compositions, which obtained by curing the polyvinyl chloride plastisol at 200° C. for 20 minutes (Sample No. 36) and of a molded article obtained by curing the unsaturated polyester resin solution D-1 for 24 hours at room temperature and for 1 hour at 60° C. (Sample No. 38) are also shown in Table 9.

Further, there were produced laminates of satin-woven fabrics of glass fibers with said compositions, and the physical properties thereof were determined. Results are also shown in Table 9.

| Stabilizer (Zn/Cd/Ba liquid organic complex) | 5 |
| Benzoyl peroxide (50% DOP paste) | 2 |
| Unsaturated polyester resin solution F-1 | 200 |

TABLE 9

| Formulation (parts) | Sample Number | | |
|---|---|---|---|
| | [1] 36 | [2] 37 | [1] 38 |
| Vinyl chloride resin | 100 | 100 | |
| Di-(2-ethylhexyl) phthalate | 60 | 30 | 30 |
| Stabilizer (Zn/Cd/Ba liquid organic complex) | 3 | 3 | |
| Benzoyl peroxide (50% DOP paste) | 3.2 | 3.2 | 3.2 |
| Trimethylolpropane trimethacrylate | | 30 | |
| Unsaturated polyester resin solution D-1 | 160 | 160 | 160 |
| Dimethylaniline | | | 0.8 |
| Molded article: | | | |
| Pot life | >5 days | >5 days | <1 hour. |
| Appearance | Semi-transparent to transparent. | Semi-transparent to transparent. | Transparent. |
| Volume shrinkage (percent) | 3.0 | 3.0 | 3.3 |
| Water absorption (percent) | 0.52 | 0.09 | 0.21 |
| Rockwell hardness (M) | Measurement impossible | 58 | 110 |
| Shore hardness (D) | 74 | 87 | 89 |
| Tensile strength (kg./mm.²) | 5.1 | 7.2 | 4.4 |
| Flexural strength (kg./mm.²) | | 12.6 | 10.0 |
| Modulus of elasticity (kg./mm.²) | 280 | 320 | 299 |
| Compressive strength (kg./mm.²) | 10 | 14 | 12 |
| Charpy impact strength (kg. cm./cm.²) | 3.4 | 5.3 | 3.1 |
| Alkali resistance (20% NaO, 24 hours) | +0.3 | −0.5 | −3.5 |
| Flame resistance | Self-extinguishing | Self-extinguishing | Easily combustible. |
| Glass fabric laminates: | | | |
| Rockwell hardness (M) | | 79 | 113 |
| Tensile strength (kg./mm.²) | | 31.4 | 27.9 |
| Flexural strength (kg./mm.²) | | 50 | 48 |
| Modulus of elasticity (kg./mm.²) | | 2,150 | 1,960 |
| Charpy impact strength (kg. cm./cm.²) | | 140 | 125 |

[1] Comparison. [2] This invention.

EXAMPLE 10

One hundred parts of the vinyl chloride resin for plastisol having an average degree of polymerization of 1700 was mixed with 60 parts of ethyleneglycol dimethacrylate, 5 parts of the stabilizer and 2 parts of benzoyl peroxide (50% DOP paste), and the defoaming treatment was carried out under reduced pressure. Thus there was produced a polyvinyl chloride plastisol.

Separately, a four-neck flask equipped with a stirrer, a thermometer, a steam and water-jacketed partial condenser, and a nitrogen gas-introducing tube was charged with 1.1 moles of neopentyl glycol, 0.5 mole of isophthalic acid, 0.5 mole of maleic anhydride, and 5% of xylene based on these charges. They were reacted for 4 hours at 150–180° C. and for 5 hours at 210–220° C. While removing water formed by the reaction. Then, xylene was removed from the reaction product under reduced pressure and thus there was obtained an unsaturated polyester resin F having an acid value of 17.

One hundred and twenty parts of the unsaturated polyester resin F was dissolved 80 parts of styrene and 0.1% of hydroquinone was added thereto to produce an unsaturated polyester resin solution F-1. The resin solution F-1 was added to the polyvinyl chloride plastisol to produce a thermosetting resinous composition (Sample No. 39). The composition was molded at 130° C. for 10 minutes. The appearance and mechanical properties of the molded article were examined. Further, with use of the composition, there was produced a laminate of satin-woven fabrics of glass fibers, and physical properties thereof were determined. Results are shown in Table 10 below.

TABLE 10

Sample No. 39 (this invention)

Formulation (parts):

| Vinyl chloride resin | 100 |
| Ethyleneglycol dimethacrylate | 60 |

Molded article:

| Pot life (days) | More than 5 |
| Appearance | [1] |
| Volume shrinkage (percent) | 3.5 |
| Water absorption (percent) | 0.04 |
| Rockwell hardness (R) | 130 |
| Tensile strength (kg./mm.²) | 6.3 |
| Flexural strength (kg./mm.²) | 12.8 |
| Modulus of elasticity (kg./mm.²) | 411 |
| Compressive strength (kg./mm.²) | 15.8 |
| Alkali resistance (20% NaOH; 24 hours) | −0.3 |
| Flame resistance | [2] |

Glass fabric laminate:

| Rockwell hardness (R) | 131 |
| Tensile strength (kg./mm.²) | 25.1 |
| Flexural strength (kg./mm.²) | 35.3 |
| Tensile strength (kg./mm.²) | 25.1 |
| Flexural strength (kg. mm.²) | 35.3 |
| Modulus of elasticity (kg./mm.²) | 1600 |
| Impact strength (kg.·cm./cm.²) | 100 |

[1] Semi-transparent to transparent.
[2] Self-extinguishing.

EXAMPLE 11

One hundred parts of the vinyl chloride resin for plastisol having an average degree of polymerization of 1700 was mixed with 30 parts of di-(2-ethylhexyl) phthalate, 30 parts of trimethylolpropane trimethacrylate, 3 parts of the stabilizers and 1 part of tertiary-butyl perbenzoate, and the mixture was subjected to defoaming treatment under reducer pressure to produce a polyvinyl chloride plastisol. The plastisol was added to 100 parts of the unsaturated polyester resin solution E-1 to produce a coating composition (Sample No. 40). Then, the composition was coated on a steel panel to a thickness of 35–40 microns, followed by baking and drying. Properties of the coating composition and the resulting film were compared with those of comparative polyvinyl chloride plastisol compositions (Sample Nos. 41, 42 and 43) and films prepared therefrom. Results are shown in Table 11. It was readily understood that in the composition of this invention (Sample No. 40) the change of viscosity during storage was very small and the coating film prepared therefrom was excellent in hardness, flexibility and adhesive property.

panel (thickness of 0.8 mm.) cleaned by the solvent-degreasing treatment by means of a spray until the thickness of the primer undercoating became 4–6 microns. Then the primer-coated steel panel was dried, and the above white coating composition was coated thereon by means of a spray and baked at 160° C. for 10 minutes in a hot air oven. At that point, the total thickness of the coating was 40–45 microns. When the coating film produced on the test steel panel was subjected to property tests, there were obtained excellent results, which are shown in Table 13.

TABLE 11

| Formulation (parts) | Sample Number | | | |
|---|---|---|---|---|
| | [1] 40 | [2] 41 | [2] 42 | [2] 43 |
| Vinyl chloride resin for paste | 100 | 100 | 100 | 100 |
| Di-2-ethylhexyl)phthalate | 30 | 60 | 30 | 60 |
| Trimethylolpropane trimethacrylate | 30 | | 30 | |
| Unsaturated polyester resin solution | 100 | | | 100 |
| Unsaturated polyester resin Solution E-1 | | | | |
| Stabilizer (organotin compound) | 3 | 3 | 3 | 3 |
| Tertiary butyl perbenzoate | 1 | | | |
| Baking conditions: | | | | |
| Temperature (° C.) | 150 ... 180 | 150 ... 180 | 150 ... 180 | 150 ... 180 |
| Time (minutes) | 10 ... 10 | 10 ... 10 | 10 ... 10 | 10 ... 10 |
| Film tests: | | | | |
| Transparency of film | Transparent ... Transparent | Opaque ... Transparent | Opaque ... Transparent | Opaque ... Opaque |
| Pencil hardness | HB ... HB | <5B ... 5B | <5B ... 2B | 4B ... B |
| Cross-cut adhesion A[3] | 95/100 ... 96/100 | 0/100 ... 0/100 | 0/100 ... 0/100 | 0/100 ... 0/100 |
| Cross-cut adhesion B[4] | 100/100 ... 100/100 | 100/100 ... 100/100 | 100/100 ... 0/100 | 0/100 ... 88/100 |
| Erichsen value (mm.) | >8 ... >8 | >8 ... >8 | >8 ... 0.5 | 0.5 ... 1.1 |
| Impact resistance (¼ inch, 500 g.) (cm.) | 50 ... 50 | 50 ... 50 | 50 ... 50 | <10 ... <10 |
| Viscosity of coating composition:[5] | | | | |
| Just-after preparation | 2,100 | 4,800 | 5,200 | 1,050 |
| 1 hour after preparation | 2,100 | 4,900 | 5,200 | >15,000 |
| 24 hours after preparation | 3,100 | 10,000 | 10,100 | Gelled |
| 7 days after preparation | 5,800 | 13,100 | Gelled | |

[1] This invention.
[2] Comparison.
[3] Cross-cut adhesion Test A was conducted without use of any primer;  [4] Cross-cut adhesion Test B was conducted on a film coated on a steel plate having a primer undercoating composed mainly of a vinyl chloride/vinyl acetate copolymer containing carboxylic acid groups;  [5] Values of apparent viscosity (centipoises) measured by BH-type viscometer (20 r.p.m.).

EXAMPLE 12

Coating composition (Sample No. 44) of the formulation indicated in Table 12 was prepared in the same manner as in Example 11 except that the unsaturated polyester resin solution B-1 was used instead of the unsaturated polyester resin solution E-1. The film was prepared from this coating composition in the same manner as in Example 11 and as a result of the film tests it was confirmed that the film exhibited similar properties to those of the film prepared from the composition (Sample No. 40) of Example 11.

TABLE 12

Sample No. 44 (this invention)
Formulation (parts):
Vinyl chloride resin _____ 100
Di-(2-ethylhexyl)phthalate _____ 30
Trimethylolpropane trimethacrylate _____ 30
Unsaturated polyester resin solution B-1 ____ 100
Stabilizer (organotin compound) _____ 3
Tertiary-butyl perbenzoate _____ 1

EXAMPLE 13

Fifty parts of titanium dioxide and 5 parts of dibasic lead phthalate were kneaded and dispersed in 60 parts of di-(2-ethylhexyl) phthalate, and 100 parts of the vinyl chloride resin for plastisol, 40 parts of tetraethyleneglycol dimethacrylate and 6 parts of benzoyl peroxide (50% DOP paste) were added thereto and mixed. The mixture was subjected to a defoaming treatment to produce a polyvinyl chloride plastisol. Then the plastisol was mixed with 200 parts of a 50% solution of the unsaturated polyester resin F in styrene to prepare a white coating composition (Sample No. 45).

A primer composed mainly of a carboxylic acid-containing copolymer of vinyl chloride and vinyl acetate ("Vinilite VMCH" manufactured by Union Carbide Corporation: registered trademark) was coated on a steel

TABLE 13

Sample No. 45 (this invention)
Formulation (parts):
Titanium dioxide _____ 50.
Dibasic lead phthalate _____ 5.
Di(2-ethylhexyl) phthalate _____ 60.
Vinyl chloride resin _____ 100.
Stabilizer (organotin compound) _____ 3.
Benzoyl peroxide (50% DOP paste) ____ 6.
Tetraethyleneglycol dimethacrylate ____ 40.
Unsaturated polyester resin F _____ 100.
Styrene _____ 100.
Baking conditions:
Temperature (° C.) _____ 160.
Time (minutes) _____ 10.
Results of film tests:
Gloss (at 60°) _____ 95.
Pencil hardness _____ H.
Cross-cut adhesion test _____ 100/100.
Erichsen value _____ 8 mm.
Bending test (diameter=10 mm.; bending angle=90°) _____ Not changed.
Impact resistance (Du Pont method) (¼ inch, 500 g.) _____ 50 cm. (passed).
Taper abrasion test (ring=CS-17; load=500 g.) _____ 28 mg./1000 r.p.m.
Salt spraying test (400 hours) _____ Not changed.
Moisture resistance test (relative humidity=98%; 400 hours) __ Not changed.
Alkali spot test (5% NaOH; 7 days) _____ Not changed.
Acid spot test (20% $H_2SO_4$; 7 days) _____ Not changed.

EXAMPLE 14

Coating compositions (Sample Nos. 46 and 47) of the formulation indicated in Table 14 were prepared in the same manner as in Example 13 except that polyethyleneglycol dimethacrylate or diallyl phthalate was used as the reactive plasticizer instead of tetraethylene glycol dimethacrylate, and coating films prepared from these compositions were subjected to property tests in the same manner as in Example 13. Results obtained were as excellent as those obtained in Example 13.

TABLE 14

| Formulation (parts) | Sample Number | |
|---|---|---|
| | [1] 46 | [1] 47 |
| Titanium dioxide | 50 | 50 |
| Dibasic lead phthalate | 5 | 5 |
| Di-(2-ethylhexyl) phthalate | 60 | 60 |
| Vinyl chloride resin | 100 | 100 |
| Benzoyl peroxide (50% DOP paste) | 6 | 6 |
| Polyethyleneglycol dimethacrylate | 40 | |
| Diallyl phthalate | | 40 |
| Unsaturated polyester resin F | 100 | 100 |
| Styrene | 100 | 100 |

[1] This invention.

EXAMPLE 15

One hundred parts of the vinyl chloride resin for plastisol was mixed with 30 parts of di-(2-ethylhexyl) phthalate, 60 parts of ethyleneglycol dimethacrylate, 2 parts of stabilizer (Zn/Cd/Ba liquid organic complex), and 12 parts of benzoyl peroxide (50% DOP paste), and the mixture was subjected to a defoaming treatment under reduced pressure to produce a polyvinyl chloride plastisol. The plastisol was mixed with 400 parts of a 50% styrene solution of the unsaturated polyester resin B to produce a coating composition (Sample No. 48). The composition was coated on a hard board by means of a curtain flow coater, and baked at 140° C. for 20 minutes in a hot air oven. The thickness of the dried coating film was about 125 microns. The film was subjected to property tests and there were obtained excellent results, which are shown in Table 15.

A comparative coating composition (Sample No. 49) was prepared by mixing 0.5 part of methylethylketone peroxide and 0.1 part of cobalt naphthenate into 100 parts of 40% styrene solution of the unsaturated polyester resin B. This comparative composition was similarly coated on a hard board and properties of the film were similarly tested. Results are also shown in Table 15.

TABLE 15

| Formulation (parts) | Sample Number | |
|---|---|---|
| | [1] 48 | [2] 49 |
| Vinyl chloride resin | 100 | |
| Di-(2-ethylhexyl) phthalate | 30 | |
| Ethyleneglycol dimethacrylate | 60 | |
| Stabilizer (Zn/Cd/Ba liquid organic complex) | 2 | |
| Benzoyl peroxide (50% DOP paste) | 12 | |
| Unsaturated polyester resin B | 200 | 60. |
| Styrene | 200 | 40. |
| Methylethylketone peroxide | | 0.5. |
| Cobalt naphthenate | | 0.1. |
| Baking conditions: | | |
| Temperature (° C.) | 140 | Room temperature. |
| Time | 20 minutes | 48 hours. |
| Film tests: | | |
| Cross-cut adhesion test | 100/100 | 85/100. |
| Pencil hardness | H | H. |
| Impact resistance (½ inch, 500 g.), cm. | 40 | 10. |
| Abrasion test (ring=CS-19, load=500 g.) | 30 mg./1,000 r.p.m. | 155 mg./1,000 r.p.m. |
| Alkali spot test (10% NaOH, 24 hours) | Not changed | Softened and peeled. |
| Acid spot test (20% H₂SO₄, 24 hours) | do | Not changed. |

[1] This invention.
[2] Comparison.

What we claim is:

1. A thermosetting resinous composition for molding comprising
   4–76.5% by weight of a vinyl chloride resin, said vinyl chloride resin being a homopolymer of vinyl chloride or a copolymer of vinyl chloride with a minor amount of a copolymerizable monomer and having a particle size of from 0.05 to 50 microns and a degree of polymerization ranging from 500 to 2500;
   2–80% by weight of an unsaturated polyester resin obtained by condensation of (a) a polyhydric alcohol and (b) a mixture of an unsaturated α,β-dicarboxylic acid and an aromatic dicarboxylic acid, said unsaturated polyester resin having an average condensation degree of at least 4 and an average molecular weight of at least 1000;
   2–50% by weight of a reactive plasticizer selected from the group consisting of allyl esters of polycarboxylic acids and esters having the formula

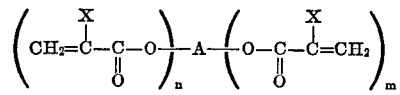

wherein A is a residue of a compound having at least two terminal hydroxyl groups or of a compound having at least one ester or ether linkage in the molecule and at least two terminal hydroxyl groups; X stands for hydrogen, halogen or an alkyl group having 1 to 2 carbon atoms; and $n$ and $m$ are integers from 1 to 3;
   1.5–54% of a non-reactive plasticizer;
   0–48% of a vinyl monomer; and
   0.2–3% of a polymerization initiator.

2. A composition according to claim 1 wherein said copolymerizable monomer is selected from the group consisting of vinyl acetate, vinyl propionate, methyl methacrylate, butyl acrylate, vinylidene chloride, acrylonitrile, vinyl ether, diethyl maleate, acrylic acid, methacrylic acid and maleic anhydride.

3. A composition according to claim 1 wherein said non-reactive plasticizer is selected from the group consisting of diesters of phthalic acid and a saturated monohydric alcohol, esters of aliphatic acids and a saturated monohydric alcohol, and phosphate esters.

4. A composition as defined in claim 1 which comprises
   5–50% by weight of the vinyl chloride resin,
   10–60% by weight of the unsaturated polyester resin, and
   25–50% by weight of the reactive plasticizer.

5. A composition as defined in claim 1 which comprises
   5–50% by weight of the vinyl chloride resin,
   10–60% by weight of the unsaturated polyester resin,
   5–40% by weight of the reactive plasticizer and less than 40% of a vinyl monomer.

6. A thermosetting resinous composition as defined in claim 1, wherein the vinyl monomer is at least one compound selected from the group consisting of styrene, vinyl acetate, methyl methacrylate, butyl acrylate, chlorostyrene and divinyl benzene.

7. A thermosetting resinous composition as defined in claim 1, which comprises a reinforcing material selected from the group consisting of asbestos, carbon fiber, glass fiber, synthetic fiber and natural fiber.

8. A thermosetting resinous coating composition comprising
   15–90% by weight of a polyvinyl chloride plastisol;
   5–75% by weight of an unsaturated polyester resin solution, said resin being obtained by condensation of (a) a polyhydric alcohol and (b) a mixture of an unsaturated α,β-dicarboxylic acid and an aromatic dicarboxylic acid, said unsaturated polyester resin having an average condensation degree of at least 4 and an average molecular weight of at least 1000;

2–40% by weight of a reactive plasticizer selected from the group consisting of allyl esters of polycarboxylic acids and esters having the formula

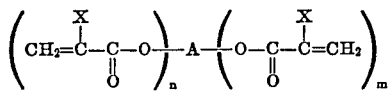

wherein A is a residue of a compound having at least two terminal hydroxyl groups or of a compound having at least one ester or ether linkage in the molecule and at least two terminal hydroxyl groups; X stands for hydrogen, halogen, or an alkyl group having 1 to 2 carbon atoms; and $n$ and $m$ are integers from 1 to 3;

0.2–3% by weight of a polymerization initiator, said plastisol containing 15–60% by weight of a non-reactive plasticizer and said unsaturated polyester resin solution containing less than 60% by weight of a vinyl monomer.

9. A process for the preparation of a molded article and film comprising curing the composition of claim 1 at a temperature of from 100 to 140° C. before changing of the sol state of the mixture.

References Cited

UNITED STATES PATENTS

| | | | |
|---|---|---|---|
| 2,539,207 | 1/1951 | Safford | 260—862 X |
| 2,567,719 | 9/1951 | Loritsch et al. | 260—872 X |
| 2,618,621 | 11/1952 | Burt | 260—31.8 M X |
| 2,851,379 | 9/1958 | Staudinger et al. | 260—862 X |
| 3,133,825 | 5/1964 | Rubens | 260—862 X |
| 3,363,028 | 1/1968 | Szalay | 260—862 |

LEWIS T. JACOBS, Primary Examiner

U.S. Cl. X.R.

260—31.8 M, 862, 872